US007388865B2

(12) United States Patent
Parent et al.

(10) Patent No.: US 7,388,865 B2
(45) Date of Patent: Jun. 17, 2008

(54) MULTI-PROTOCOL ROUTE POLICY SPECIFICATION LANGUAGE

(75) Inventors: Florent Parent, Cap-Rouge (CA); Marc Blanchet, St-Augustin (CA)

(73) Assignee: Hexago Inc., Montreal, Quebec (CA)

( * ) Notice: Subject to any disclaimer, the term of this patent is extended or adjusted under 35 U.S.C. 154(b) by 1136 days.

(21) Appl. No.: 10/271,759

(22) Filed: Oct. 17, 2002

(65) Prior Publication Data

US 2004/0076149 A1    Apr. 22, 2004

(51) Int. Cl.
*H04L 12/56* (2006.01)
(52) U.S. Cl. ............... 370/392; 370/466; 709/220
(58) Field of Classification Search ............ None
See application file for complete search history.

(56) References Cited

U.S. PATENT DOCUMENTS 6,167,444 A * 12/2000 Boden et al. ............... 709/223
6,850,528 B1 * 2/2005 Crocker et al. ............. 370/401
7,003,562 B2 * 2/2006 Mayer .......................... 709/223

OTHER PUBLICATIONS

Internet Draft- "IPv6 Routing Policies using RPSL draft-parent-rpsl-ipv6-00.txt" F. Parent, Oct. 17, 2001.
Internet Draft- RPSL extensions for IPv6 and Multicast Routing Policies draft-parent-multiprotocol0rpsl-00.txt Viagenie(F. Parent).
Standards Track-Routing Policy Specification Language (RPSL) Alaettinoglu et al., Jun. 1999.
Internet Draft- "IPv6 Routing Policies using RPSL draft-parent-rpsl-ipv6-00.txt" F. Parent, Oct. 18, 2001.

\* cited by examiner

*Primary Examiner*—Wing Chan
*Assistant Examiner*—Brian Roberts
(74) *Attorney, Agent, or Firm*—Ogilvy Renault LLP (57) ABSTRACT

An extended Routing Policy Specification Language (RPSL) permits registry of independent routing policies for different Internet Protocol versions, while being compatible with existing RPSL. Address family identifiers (afis) for identifying a protocol version are inserted into attributes of objects that carry IP address prefixes. RPSL is also extended to permit separate handling of multicast routing policies in any protocol, by including subsequent address family indicators (safis).

14 Claims, 7 Drawing Sheets

MULTI-PROTOCOL ROUTE POLICY SPECIFICATION LANGUAGE

CROSS-REFERENCE TO RELATED APPLICATIONS

This is the first application filed for the present invention.

MICROFICHE APPENDIX

Not Applicable.

TECHNICAL FIELD

The invention generally relates to routing policy specification for autonomous systems of a data packet network, and, in particular, to a method and system for extending a routing policy specification language to concurrently handle routing policy specifications for different Internet Protocol (IP) versions and multicast over different IP versions.

BACKGROUND OF THE INVENTION

To meet with the growing demand for Internet service, the Internet engineering task force (IETF) has introduced a standard for a next version of Internet Protocol (IP), generally referred to as Internet Protocol version 6, or simply "IPv6". Most of today's Internet uses IP version 4 (IPv4). The most important deficiencies in IPv4 identified by the IETF have been addressed, and are corrected in IPv6. Chief among these is the shortage of addresses. The number of IP addresses supported by IPv4 is expressible in 32 bits (i.e. $2^{32}$=4,294,967,296). This number of addresses is not enough to support world-wide demand for Internet addresses.

Figure 1:
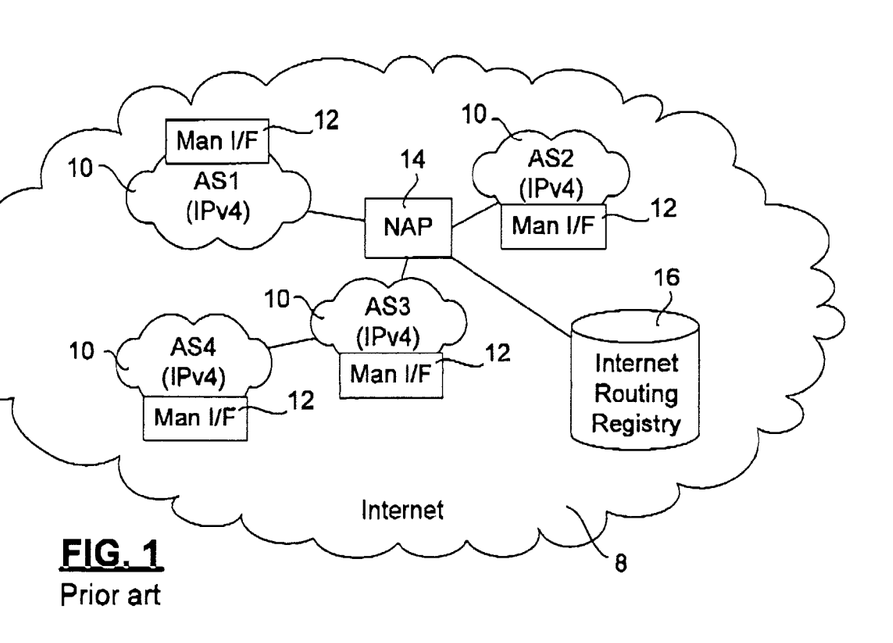
FIG. 1 is a schematic block diagram of a prior art Internet Protocol (IP) version 4 network.

IPv6 is expected to co-operate with IPv4 initially. It is also expected that eventually IPv4 will be phased out altogether, leaving only the IPv6. Accordingly, many details regarding co-operation of IPv4 and IPv6 have to be resolved. One important aspect of IP networks is related to routing policies. As is illustrated in FIG. 1, a typical Internet 8 includes a plurality of interconnected autonomous systems 10 (ASs) (only 4 illustrated) that respectively include routers, servers and the like, as well as a management interface 12. Each router in AS 10 is provisioned with a routing policy, that specifies handling properties for routes, etc. A network access point 14 (NAP) interconnects the ASs 10 and provides the management interfaces 12 with a single, co-operatively maintained, Internet routing registry database 16, well known in the art. The route registry database 16 provides for the exchange of policy information that makes inter-AS routing substantially less prone to error. Currently the language used to express routing policies is an object-oriented language called Routing Policy Specification Language (RPSL). RPSL is currently adapted to support only unicast IPv4 routing policies and cannot be used to specify routing policies for both IPv4 and IPv6, or for multicast traffic routing carried over either IPv4 or IPv6. As the demand for IPv6 increases, and more IPv6 ASs are deployed, the requirement for IPv6 routing policies increases proportionally. While it is possible to provide new, additional route registries and a new route specification language for IPv6, the inefficiencies of such a solution are not economical.

Consequently, there is a need for a method for extending RPSL to handle current needs facing AS management in relation to concurrent support of routing policies for both IPv4 and IPv6, as well as for multicast in either protocol, as described in part in an Internet-Draft that is a working document of the Internet Engineering Task Force (IETF), entitled "IPv6 Routing Policies using RPSL—draft-parent-rpsl-ipv6-00.txt" published by co-applicant Florent Parent on Oct. 17, 2001.

SUMMARY OF THE INVENTION

It is therefore an object of the invention to provide a method for extending the Routing Policy Specification Language (RPSL) to enable the expression of routing policies for different IP versions.

It is another object of the invention to provide a method for extending RPSL to enable an expression of routing policies respecting multicast routing over different IP versions.

Accordingly, the invention provides a method for extending routing policy specification language (RPSL) to express independent routing policies for different Internet Protocol (IP) versions. The method comprises extending RPSL object attributes that identify routes by inserting an address family identifier (afi) for identifying a protocol version associated with the routes, and extending RPSL object attributes for importing or exporting routing policies by inserting an address family identifier (afi) for identifying a protocol version associated with the routing policies, so that the routing policies can be accepted and announced for different protocol versions.

The invention further provides an extended routing policy specification language (RPSL) for expressing routing policies respecting different versions of Internet Protocol (IP). The extended RPSL comprises object classes having respective attributes for identifying routes and sets of routes, each of which attributes comprise an address family identifier (afi) used to identify an Internet protocol version, and an object used to register a routing policy, the object comprising an attribute for specifying an Internet Protocol in relation to which the routing policy applies.

The invention further provides a route registry database adapted to store routing policy records associated with respective autonomous systems (ASs) that support different versions of Internet Protocol. The route registry database comprises means for storing the routing policy records, and permitting the records to be added, modified, deleted or retrieved, and means for parsing routing policy information related to the records to extract address family identifiers (afis) in order to determine an Internet Protocol version with which the policy information is associated.

The extended RPSL further provides subsequent address family indicators (safis) that are used to identify routing policies associated with multicast routes associated with any IP version. The extended RPSL therefore supports multicast route policy specification in both IPv4 and IPv6.

BRIEF DESCRIPTION OF THE DRAWINGS

Further features and advantages of the present invention will become apparent from the following detailed description, taken in combination with the appended drawings, in which.

It should be noted that throughout the appended drawings, like features are identified by like reference numerals.

DETAILED DESCRIPTION OF THE PREFERRED EMBODIMENT

The invention provides for the extension of the Routing Policy Specification Language (RPSL) to enable an expression of Internet Protocol version 6 (IPv6) and multicast routing policies. The use and scope of the extended RPSL are first described, and then specific extensions to the RPSL in accordance with an embodiment of the invention are described in detail.

Figure 2:
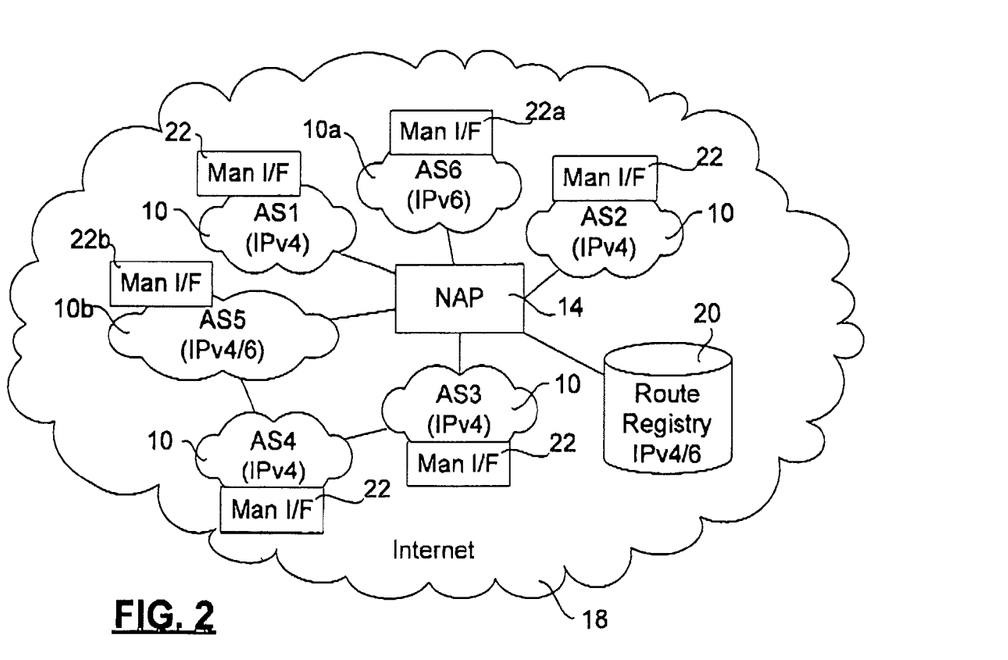
FIG. 2 schematically illustrates a current Internet protocol network supporting IPv4 and IPv6 routes.

FIG. 2 schematically illustrates the heterogeneous IPv4/IPv6 Internet 18. The ASs 10 shown in FIG. 1 are interconnected with ASs 10a that support only IPv6, and ASs 10b that support both IPv4 and IPv6. A route registry 20 provides records of both IPv4 and IPv6 routing policies, in accordance with the present invention. Accordingly, each of the gateway routers of ASs 10,10a, 10b is connected to the network access point 14 (NAP), and can access the route registry 20, where they register to import routing policies from, and export routing policies to, the other ASs. Management interfaces 22 of ASs 10 are used to independently manage IPv4 routing policies. Management interfaces 22 of ASs 10a, 10b are adapted to permit differentiated routing policies using extended RPSL, in accordance with the present invention. The use of extended RPSL permits different routing policies to be specified for IPv6 and IPv4, respectively, for both unicast and multicast routes.

Figure 3:
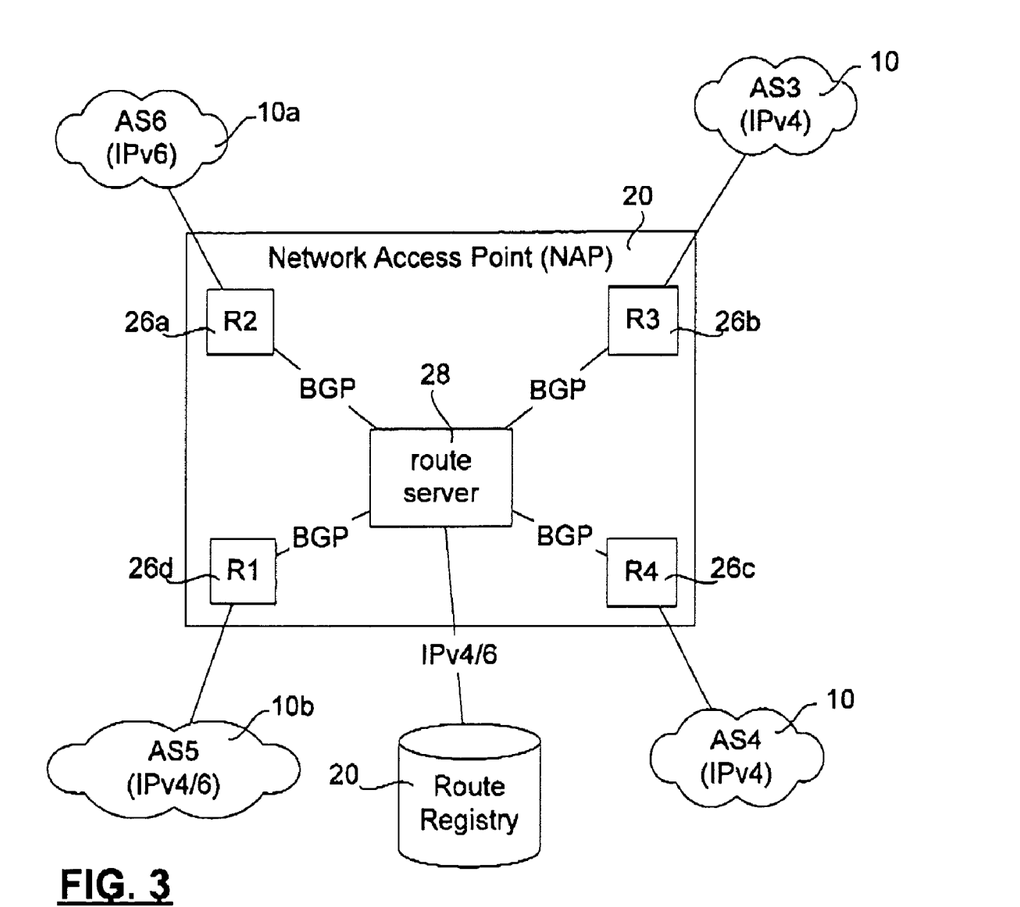
FIG. 3 is a schematic block diagram of a network access point providing a plurality of ASs with a route registry configured in accordance with the invention.

FIG. 3 schematically illustrates principal functional blocks of one configuration of the network access point 20 shown in FIG. 2. Each of the ASs 10, 10a, 10b of FIG. 2 are connected to a route server 28 via a respective gateway router 26 (R1-R4). In accordance with current practice, border gateway protocol (BGP) is used to convey the messaging between the gateway routing 26 and the route server 28. The route server 28 gets routing policy information from the route registry database 20. The route registry database 20 contains information about the policies of each of the ASs as they relate to respective IPv4 and IPv6 routes.

Figure 4:
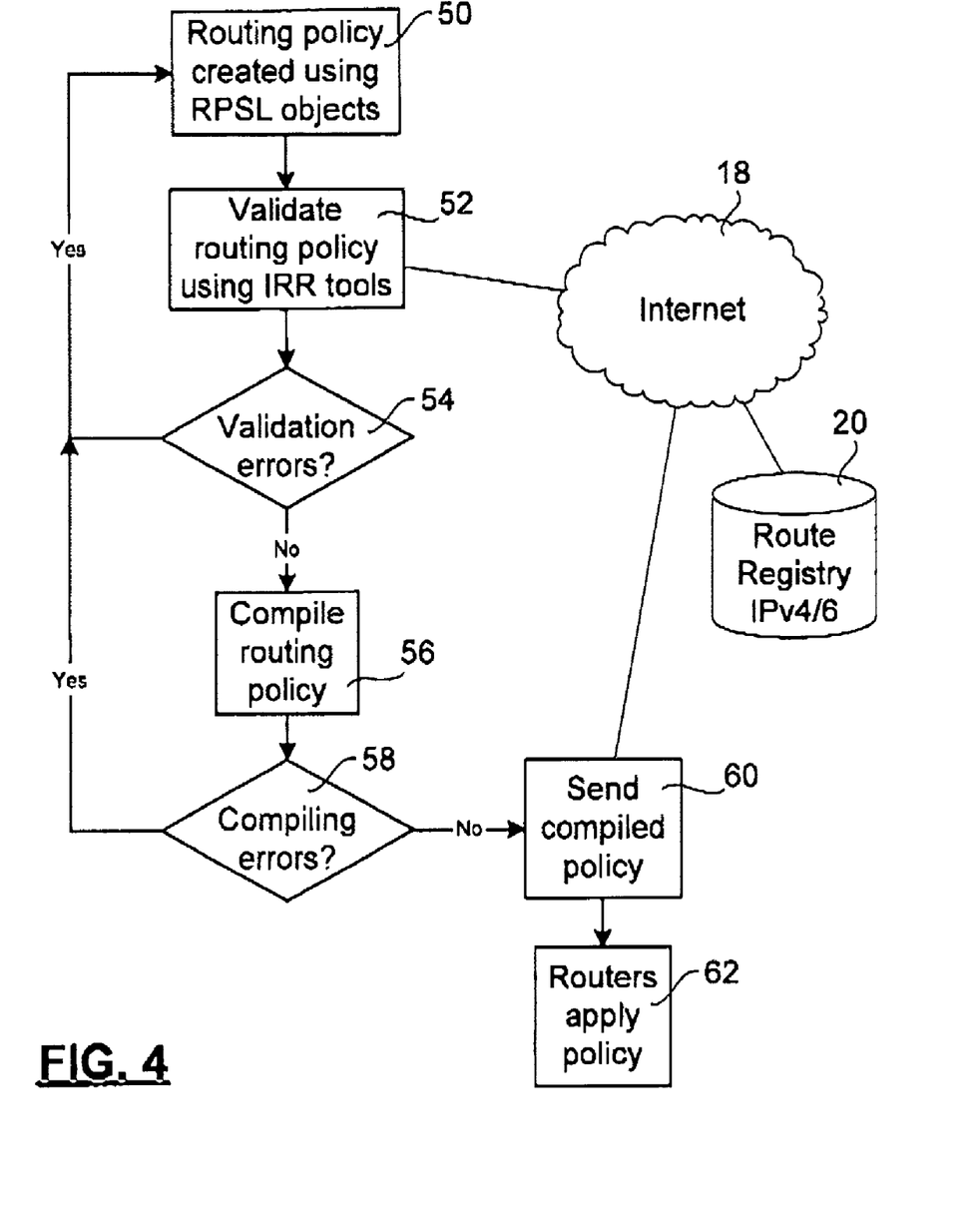
FIG. 4 is a flow chart illustrating principal steps in effecting a routing policy in accordance with an embodiment of the invention.

FIG. 4 illustrates principal steps involved in registering a routing policy that is defined in accordance with the invention. In step 50, a routing policy is created using extended RPSL objects as will be further discussed below. In step 52 the routing policy is validated using known Internet routing registry (IRR) tools, for example. The IRR tools provide for checks regarding route connectivity, etc. required to produce a functional policy. Preferably the validation is performed with reference to current data retrieved from the route registry 20. If the validation fails, as determined in step 54, the procedure returns to step 50 and the detected defects are corrected. Otherwise, in step 56, the valid routing policy is compiled. If compiling errors are detected, in step 58, the procedure returns to step 50 for correction. Otherwise the compiled policies are sent to the route server 28 or routers (step 60), and the routing policies are used to effect changes to respective router configurations, as required.

Figure 5:
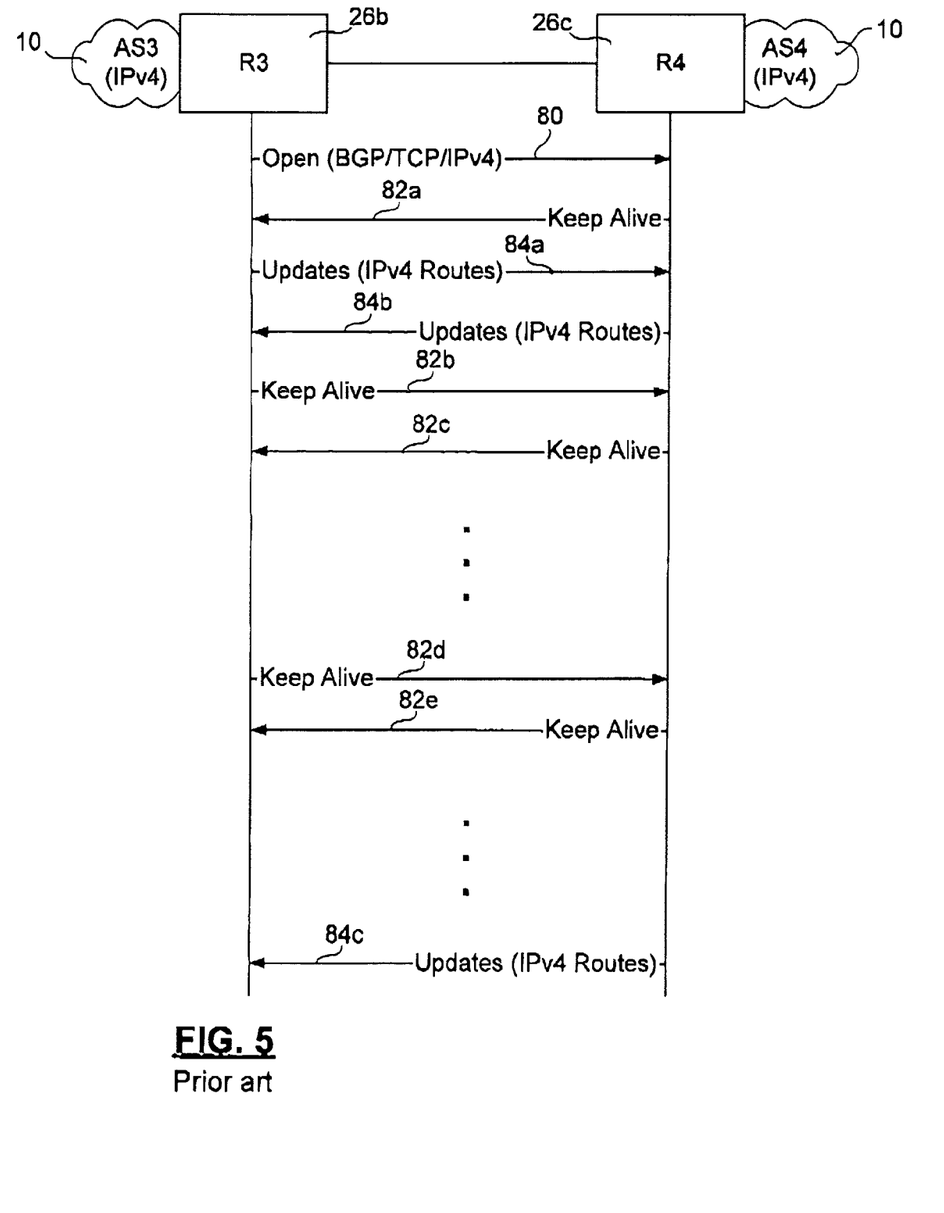
FIG. 5 is an illustration of messages exchanged between gateway routers of first and second ASs used to maintain IPv4 routing policies, in accordance with the prior art.

FIG. 5 illustrates prior art messaging between peer routers 26 (R1,R2) of ASs 10. In step 70, an open message is sent from (in this example) R1 to R2 initiating a connection therebetween. The open message is conveyed in a manner well known in the art. The open message type conforms to the BGP, and is carried on a transport control protocol (TCP) message over IPv4. As is well known in the art, the TCP is an open systems interconnect (OSI) layer 4 (transport) protocol that is responsible for packetizing and reserializing packets transported over the IPv4 network layer (layer 3). The IP layer, equally well known in the art, provides network connection signaling to provide the required communications. The BGP is also well known in the art and will not be further explained herein.

Once a route is established between the two routers, R1 and R2 periodically exchange keep alive messages 82, which keep the connection operational. The keep alive messages are exchanged at a predetermined frequency. If a keep alive message is not returned after a predefined interval of time, the BGP peer is considered unreachable and the routes learned from that peer are withdrawn.

Updates messages are also exchanged using the connections between R1 and R2. Changes to a configuration of one of the two gateway routers are performed through the management interface 12 (FIG. 2) of the associated AS 10. As these changes may be relevant to the other of the two routers, a mechanism exists for communicating information related to the changes. In steps 84a-84c, the communication of the changes to routes affected by the routing policies are communicated to the other of the two routers R1,R2. The route updates 84a-84c occur as required.

Figure 6:
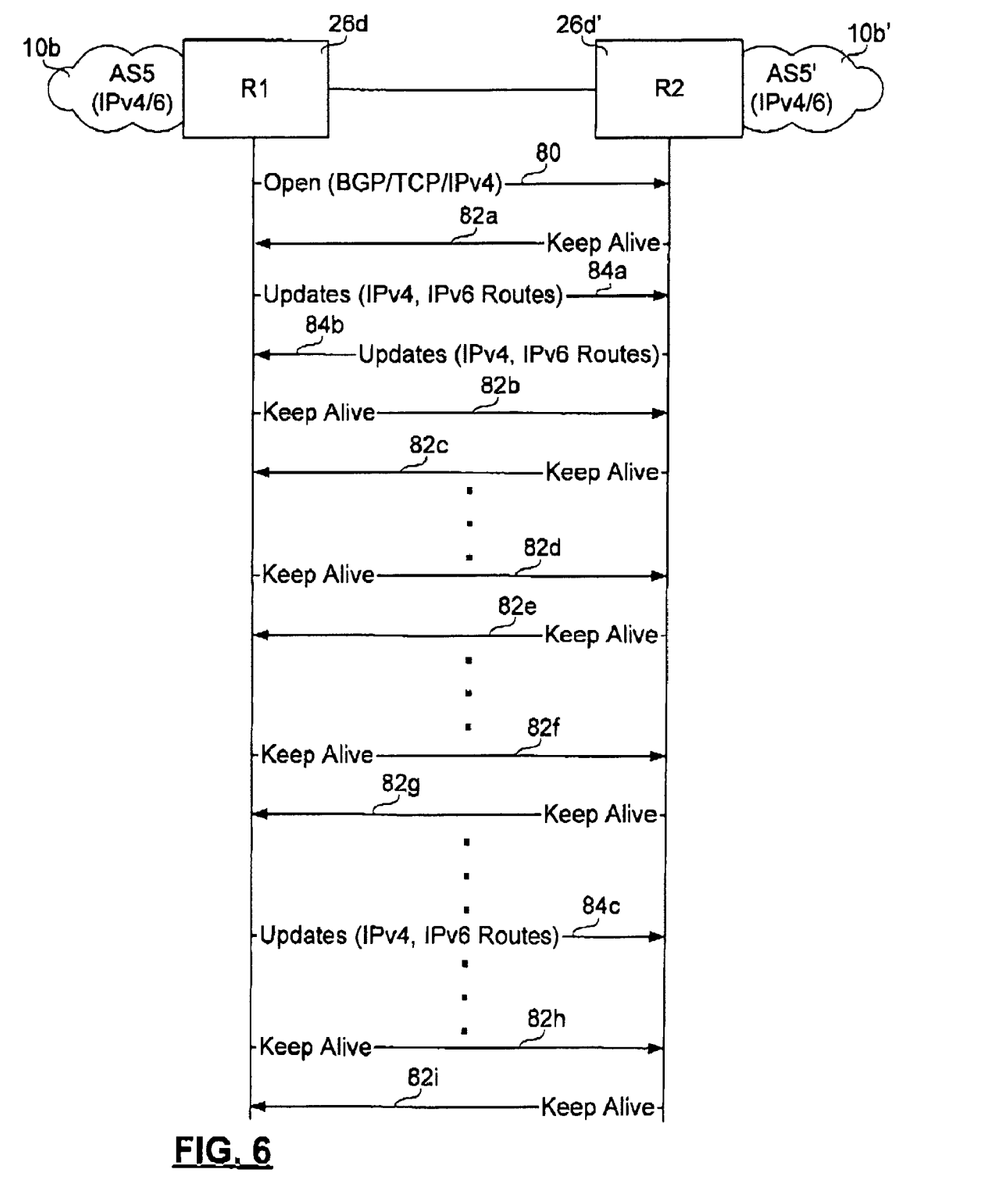
FIG. 6 is an illustration of messages exchanged between gateway routers of first and second ASs to maintain IPv4 and IPv6 routing policies in accordance with the invention.

FIG. 6 illustrates steps analogous to those shown in FIG. 5, except that in FIG. 6, the routers 26d, 26d' (R1,R2) are part of an AS that supports both IPv4 and IPv6 traffic. Consequently, steps analogous to steps 84a-84b involve updates related to both IPv4 and IPv6 routes. The connection is created between routers 26d and 26d' using IPv4 as described above with reference to FIG. 5.

Figure 7:
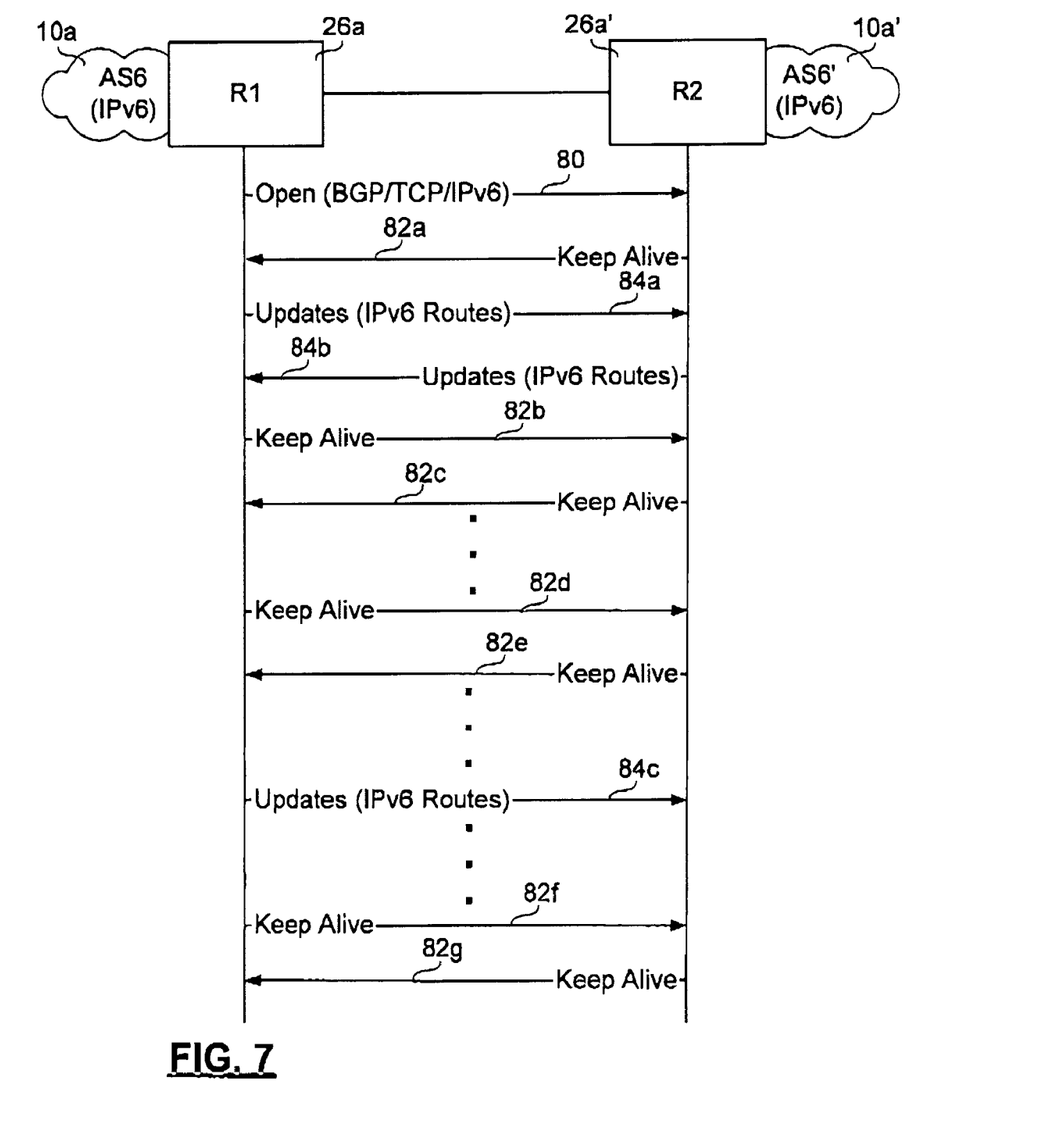
FIG. 7 is an illustration of messages exchanged between gateway routers of first and second ASs to maintain IPv4 and IPv6 routing policies for IPv6 traffic.

FIG. 7 shows the same connection setup between gateway routers 26a,26a, (R1 and R2) using BGP (step 80) as described above with reference to FIGS. 5 and 6. In this example, the respective Ass 10a,10a' support only IPv6, so the connection between R1 and R2 is established using a BGP Open message sent over TCP and IPv6. Otherwise, the messaging, keep alive messages 82a-82g and route update messages 84a-84c are identical to those described above except they convey information respecting IPv6 routes.

Extended RPSL

Extended RPSL adapted for differentiated handling of IPv4 and IPv6 routing policies extends existing RPSL to support IP versions as well as multicast routing policies in any IP version. Those skilled in the art are familiar with the existing RPSL, and it is therefore not described. Table 1 lists the extensions made to existing RPSL to provide the extended RPSL in accordance with the invention.

TABLE 1

| Class | Attribute | Current syntax | Extended RPSL syntax |
|---|---|---|---|
| route | | <address-prefix> | [afi <address-family>] <address-prefix> |
| route-set | members | <address-prefix> | [afi <address-family>] <address-prefix> |
| peering-set | peering | <as-expression> [<router-expression-1>] [at <router-expression-2>] | <as-expression> [<[afi <address-family> ] router-expression-1>] [at <[afi <address-family> ] router-expression-2>] |
| rtr-set | ifaddr | <ipv4-address> masklen <integer> [action <action>] | [afi <address-family>] <ipaddress> masklen <integer> [action <action>] |
| filter-set | filter | <address-prefix> | [afi <address-family>] <address-prefix> |
| aut-num | import | [protocol <protocol-1>] [into <protocol-2>] from <peering> [action <action>] accept <filter> | [protocol <protocol-1> [afi (address-family) safi (subsequent-address-family)]] [into <protocol-2>] from <peering> [action <action>] accept <filter> |
| aut-num | export | [protocol <protocol-1>] [into <protocol-2>] from <peering> [action <action>] announce <filter> | [protocol <protocol-1> [afi (address-family) safi (subsequent-address-family)]] [into <protocol-2>] from <peering> [action <action>] announce <filter> |

The first extension relates to different formats for IP addresses in the different IP versions. Consequently, syntax of the language must be adapted to permit any attribute that includes an IP address to accept either type of address. RPSL contains objects having attributes. Some of these attributes are used to identify one or more routes. The route-identifying attributes are extended to include an address-family identifier (afi). The afi (or absence thereof) is used to provide protocol version identification for the identified route or routes. The afi is also inserted into attributes of an object used for importing and exporting routing policies, so that the routing policies can be accepted and announced for different protocol versions.

A "route", in relation to the present invention, is a route that traverses boundaries between autonomous systems (ASs), and is therefore also known in the art as an inter-AS route, or an inter-domain route. Routes are represented in RPSL using respective route objects. A route object is an object that includes two mandatory attributes: a route, and an originating AS. In general, objects for use in RPSL are defined with a syntax and a set of mandatory attributes of an object (in a predefined order of presentation) is known as the key of the object. The key of the route object is therefore <route, origin>. The route attribute is an address-prefix, which specifies an IP address. In accordance with the present invention, two or more different kinds of address-prefixes are defined, for example: an IPv4 address-prefix of the well known format having four integers, each within the range (0-255), separated by periods, followed immediately by a "/" delimiter and then a prefix integer in the range (0-32) [e.g. 125.49.78.208/23]; and an IPv6 address-prefix consisting of 8 fields of 4 hexadecimal (0-f) digits each, delimited by colons, followed by a forward slash and a prefix integer in the range (0-128). As is well known one occurrence of a double colon in an IPv6 address represents a sequence of null integers [e.g.: 4994:7892:0814::/123, 1::4626/83, and ::6346:4168:4615:3134:8956/83. When an IPv6 type of address-prefix is used, an address family identifier (such as "afi ipv6") is used to facilitate identification. The route object may include further optional attributes in respect of membership of the route object in one or more sets; components and aggregation properties with other routes, etc., in a manner known in the art. An address-prefix range includes the address part and a range of the integer after the forward slash delimiter, and can be represented using known range operators.

A route-net object is an object having a mandatory name and an optional members attribute. The members attribute is a list of routes, each entry in the list is specified by an address-prefix, or membership in another set. The entries may further be qualified by a range operator. If the entry is a plurality of routes, the range operator distributes over the plurality of routes to apply to each of the routes individually. The route-set object is used to define a set of routes that are ultimately defined in terms of user defined routes and address-prefixes.

A peering-set object is defined by a peering-set attribute and a peering attribute. The peering-set attribute defines two sets of routers in relation to one or more ASs, and the peering attribute is the list of pairs of address-prefixes that are peered with the set of routers defined by the peering-set. More specifically the peering attribute contains a logical sentence identifying one or more ASs, and two router expressions defined using respective logical sentences that range over inet-rtrs, rtr-sets, and IP addresses. In accordance with the present invention first and second router expressions that specify the two sets of routers further includes the address family identifier (afi) associated with the route. The afi indicates the protocol used for peering over the route.

The rtr-set objects have respective rtr-set attributes that provide respective names for the instances of the object class. Similarly to the route-set object, the rtr-set object may contain a members attribute that contains a list of the routers that are members of the rtr-set.

Managing routing within an AS is performed by effecting a policy. The policy is embodied as a policy filter that effectively returns a subset of an input set, for any input set of routes. A filter-set object is a set of filters, in a now familiar form. It contains a filter-set attribute that names the instance of the object, and a single filter attribute that represents a logical statement that constructs a filter from other filters. In accordance with the invention, different policy filters can be concurrently effected in relation to IPv4 and IPv6 routing. Accordingly the filter attribute is modified by a naming convention that provides for the inclusion of a protocol version identifier, so that respective IPv4 and IPv6 routing policies can be both registered by a single AS, without risk of confusion. Furthermore it is preferable that unicast and multicast routing policies be handled independently. Therefore, in an embodiment of the invention, a subsequent address family identifier (safi) is used to specify the property that relates to the application of the filter-set.

Aut-num objects are the vehicle for specifying routing policies. An aut-num attribute is mandatory, as is an as-name attribute that provides a name following a naming convention. Import and export are two optional attributes. The import attribute is used to import a set of routes returned by a specified filter-set, from all peers in one or more specified peering-sets. Existing multi-protocol provisions of RPSL provide for the optional specification of a protocol in each import attribute, for example, to identify a protocol when operating in a multi-protocol mode. This flexibility is leveraged by providing afi and safi indicators in an optional protocol parameter, to permit specification of the application of the protocol filter. In substantially the same manner, the protocol parameter of the export attribute, which is specified to perform substantially the reverse operation, i.e., to export or announce route sets using a specified filter.

Preferably the attributes associated with IPv4 routing policies and routes do not include the afis, so that if a given expression in RPSL that relates only to IPv4 routes and policies is indistinguishable from the current RPSL. In this manner the extended RPSL is backwards compatible.

Figure 8:
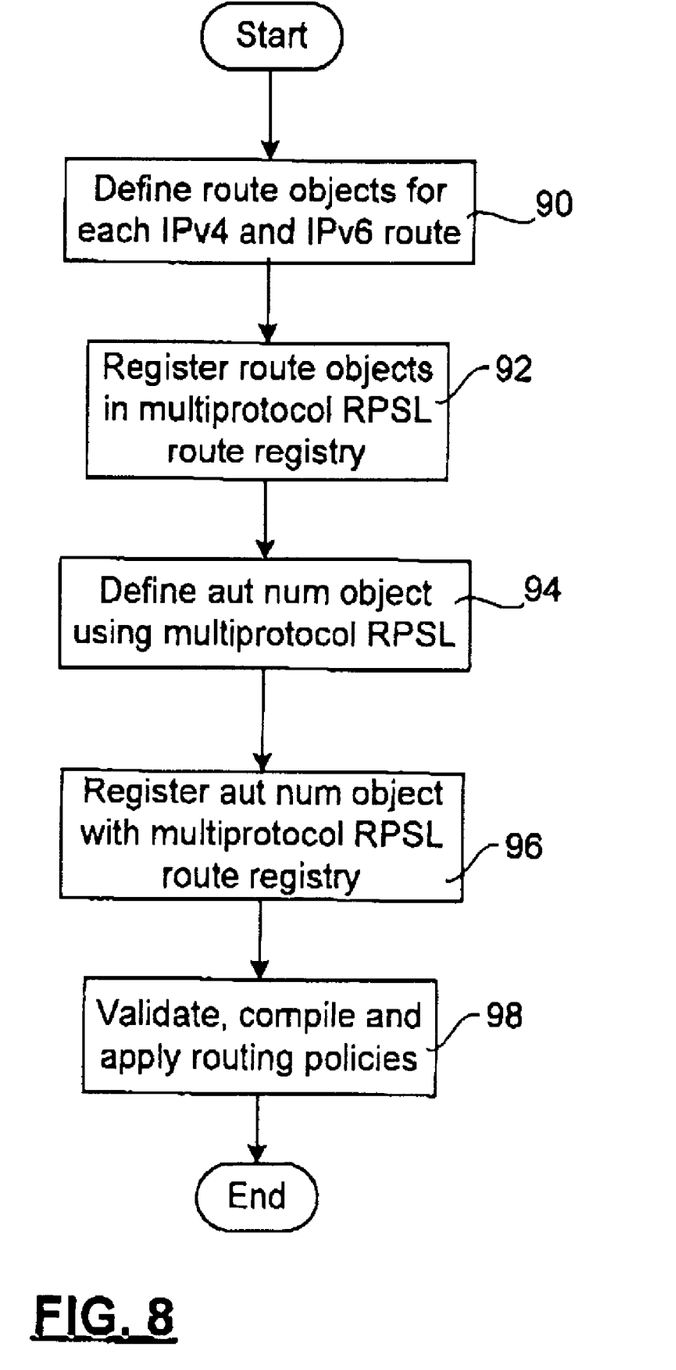
FIG. 8 is a flow chart illustrating principal steps in a method for creating a routing policy in accordance with an embodiment of the invention.

The method for creating a routing policy involves first defining route objects and sets thereof, and then using the route objects and sets thereof to create aut num objects that are used to communicate the routing policy information to the route registry database 20, as is illustrated in FIG. 8. Route objects are first defined for both IPv4 and IPv6 routes (step 90). In step 92, the route objects are registered in the multi-protocol RPSL route registry 20. Then aut num objects are defined using the peerings, and filters (step 94), and these are also registered in the multi-protocol RPSL route registry 20 (step 96). The routing registry is thereby updated with the routing policy. The routing policy is then validated, compiled and applied (step 96) as explained above with reference to FIG. 4.

Extended RPSL therefore provides differentiated multicast and routing policies for any version of Internet protocol, while being backward compatible with existing IPv4.

The embodiments of the invention described above are intended to be exemplary only. The scope of the invention is therefore intended to be limited solely by the scope of the appended claims.

We claim:

1. A method for enabling a network router to implement independent routing policies, based on a routing policy specification language (RPSL), for different Internet Protocol (IP) versions, the method comprising:
   providing a respective address family identifier (afi) for identifying at least one protocol version;
   applying the address family identifier (afi) to each route associated with the respective protocol version of the address family identifier (afi);
   applying the address family identifier (afi) to each routing policy associated with the respective protocol version of the address family identifier (afi); and
   controlling the router to forward traffic received through a route using a routing policy having an address family identifier (afi) matching that of the route.

2. A method as claimed in claim 1 wherein a respective address family identifier (afi) is provided for routes and routing policies associated with a protocol version other tan IPv4, so as to maintain backward compatability with IPv4 only routers.

3. A method as claimed in claim 2 wherein the step of applying the address family identifier (afi) to each route further comprises associating the afi with address-prefixes used in objects for specifying routes.

4. A method as claimed in claim 3 wherein the afi is inserted into address-prefix attributes of route objects.

5. A method as claimed in claim 3 wherein the afi is inserted into a members attribute of a route-set object, if the route referred to is specified using an address-prefix.

6. A method as claimed in claim 3 wherein the afi is inserted into filter attributes of filter-set objects.

7. A method as claimed in claim 2 wherein step of applying the address family identifier (afi) to each routing policy comprises inserting the afi into router expressions of a peering attribute of a peering-set object.

8. A method as claimed in claim 2 wherein the afi is inserted into an item in a members attribute list, if The item is expressed as an IP address prefix.

9. A method as claimed in claim 2 wherein the aft is inserted into a protocol parameter of an import or export attribute of an aut num object when the protocol parameter is applied.

10. A method as claimed in claim 9 further comprising inserting into the protocol parameter a subsequent address family identifier (safi) that indicates whether the routing policy relates to unicast, or multicast routes.

11. A system for storing routing policy records associated with respective autonomous systems (ASs) that support different versions of Internet Protocol, the system comprising:
   a route registry database for storing the routing policy records, and permitting the records to be added, modified, deleted or retrieved; and
   means for identifying an Internet Protocol version associated with each routing policy record, using an address family identifier (afi) in selected attributes of each routing policy record.

12. The system as claimed in claim 11 wherein the means for identifying the Internet Protocol Version defaults to Internet Protocol version 4 (IPv4) if an afi is not found in the selected attributes of the routing policy record.

13. The system as claimed in claim 11 further comprising means for responding to routing policy validation queries from Internet Routing Registry (IRR) tools.

14. The system as claimed in claim 11 further comprising means for identifying routing policies related to multicast routes using a subsequent address family indicator (safi) in selected attributes of each routing policy record.

* * * * *